Patented July 3, 1951

2,558,844

UNITED STATES PATENT OFFICE 2,558,844

PHOTOOXIDATION OF ALIPHATIC OLEFINIC HYDROCARBONS

Vincent Richard Gray and Herbert Steiner, Eccles, England, assignors to Petrocarbon Limited, London, England No Drawing. Application June 28, 1947, Serial No. 757,926. In Great Britain June 28, 1946

3 Claims. (Cl. 204—158)

This invention relates to the oxidation of aliphatic mono-olefinic hydrocarbons for the production of oxygenated compounds of aliphatic mono-olefinic hydrocarbons and to associated by products or by-products of value which may be produced in the aforesaid production of oxygenated compounds.

The main object of the invention is to provide a process for the purpose indicated by which only a small amount of polymerised product is formed or of other comparatively worthless by-products, that is to say, a process in which the by-product may be regarded as of value, and in particular to provide a process for the production of alkenyl-hydroperoxides with valuable unsaturated ketones, aldehydes and acids as by-products.

Processes for the oxidation of olefines and other unsaturated hydrocarbons have been proposed including processes for controlling such oxidation. As far as we are aware, the process according to the present application is, however, new, and differs from the prior art in some one or more respects, for example, starting material, temperatures, by-products or ease of control. Probably the first process for producing an isolated peroxide of an olefine in a state of moderate purity dealt with cyclohexene peroxide. The reaction was slow, taking from one to four months, but by a later process acceleration of the reaction was obtained through the employment of ultraviolet light.

The process was also applied to certain diolefines. Other processes for the controlled oxidation of organic compounds have relied on the presence of hydrogen bromide, for instance, in connection with unsaturated hydrocarbons or organic compounds containing at least one replaceable hydrogen atom in which case the reaction in the presence of hydrogen bromide as a controlling agent was proposed to be carried out under the influence of ultraviolet light.

The present invention consists in a process for the oxidation of aliphatic olefinic hydrocarbons with at least one pair of carbon atoms connected by a single bond which comprises subjecting the starting materials in the liquid state to the action of oxygen or oxygen containing gases at a temperature in the range 0° C. to 100° C. in the presence of ultraviolet light.

The invention also consists in a process in accordance with the preceding paragraph applied to any of the following starting materials, namely, propylene, n-butene-(1), n-butene-(2), isobutene, n-pentene (1), n-pentene (2), 2-methylbutene-(2), n-hexene (2), n-heptene-(3).

The invention also consists in a process according to either of the preceding paragraphs in which the olefinic material to be oxidised is present in the liquid phase.

The invention also consists in processes for the oxidation of aliphatic olefinic hydrocarbons carried out substanially as herein described.

The following example illustrates one way in which the invention has been carried into effect.

Example

A sample of amylene obtained from commercial amyl alcohol (that is mainly trimethyl ethylene

was contained in a quartz reactor and irradiated with ultraviolet light while oxygen was bubbled through. The vessel was cooled by an air jet, and any olefine evaporated was condensed in a trap and returned to the reactor. Irradiation for 4–6 hours at room temperature (18° C.) gave a liquid yielding 5% of oxygenated material. Excess olefine was removed in vacuo and the hydroperoxide distilled—B. Pt. 54-58° C. at 8 mm. Hg. The product absorbed bromine and oxidised ferrous salts to the extent required for the formula $C_5H_{10}O_2$, either

or

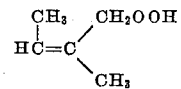

The term alkenyl hydroperoxides is the generic term of the main products formed. The two products formed in the example of which graphical formulae have just been given are respectively:

3-methyl-2-butenyl-hydroperoxide.
2-methyl-2-butenyl-hydroperoxide.

Reduction of the distilled hydroperoxides by sodium sulphite solution, gave a mixture of unsaturated alcohols shown by analysis to correspond to the formula $C_5H_{10}O$ and showing unsaturation equivalent to one double bond per molecule.

The only by-product was some polymeric residue which remained after distillation and amounted to about 10% of the converted amylene.

General

The invention is not limited as far as alkenyl hydroperoxides are concerned to the particular products referred to in the example. The term mono-olefines is to be interpreted as including mixtures of olefines and also olefines separately or mixed in admixture with other bodies, for example, with paraffins, such as occur frequently in technical products.

In general it would appear that the main reaction takes place according to the equation

$$C_nH_{2n} + O_2 = C_nH_{2n-1}-OOH$$

where $C_nH_{2n}$ stands for an aliphatic mono-olefine containing at least three carbon atoms and $C_nH_{2n-1}-OOH$ for a corresponding alkenyl hydroperoxide, that is to say, this hydroperoxide still contains a double bond, the substitution of oxygen taking place on carbon atoms not connected to a double bond. It has to be noted, however, that a shift of the double bond may occur during the reaction. The position of the double bond of the reaction product may be different from that in the starting material.

The action can be carried out with any aliphatic olefine, or mixture of aliphatic olefines falling within the above definition.

The by-products appear to originate through decomposition and further oxidation reactions of the hydroperoxide formed initially and are mainly unsaturated ketones, unsaturated aldehydes or unsaturated acids, the two latter being formed from alkenyl hydroperoxides substituted at the terminal carbon atom, the former from substitution products of non-terminal carbon atoms. All these by-products are of greater or less value. Apart from these by-products only a small amount of polymer is formed.

The reaction is carried out by irradiating with ultraviolet light the olefinic hydrocarbons in the liquid state within a temperature range from 0° C. to 100° C. in the presence of oxygen or oxygen containing gases. This can be done in vessels transparent to ultraviolet light such as for instance, quartz vessels, or, since in the temperature range preferred many olefines are gaseous at atmospheric pressure, the reaction may be carried out under pressure, in pressure vessels having a source of ultraviolet radiation built into the vessel or having quartz windows for the transmission of the ultraviolet light. Pressure conditions are not of primary importance and the treatment can be effected at atmospheric, or super-atmospheric, or sub-atmospheric pressures. The ultraviolet light may conveniently be provided by a mercury vapour lamp.

Normally the oxidation of unsaturated hydrocarbons after it has been started is difficult to control and this applies, perhaps particularly, to those with which the present invention is concerned, namely, aliphatic mono-olefines except ethylene, but the reaction is very easily controlled as described above through the agency of ultraviolet light.

Further, the products are obtained directly, that is to say, they are not contaminated with, for instance brominated substances resulting from the reaction which must be removed by a further treatment.

We regard the main features of the process of this application as:

(1) Oxidation by oxygen or oxygen containing gases (no other oxidation agent);

(2) All aliphatic mono-olefines except ethylene i. e. containing at least 3 carbon atoms;

(3) These olefines to be in the liquid state during the reaction. This implies pressures above atmospheric for normally gaseous olefines such as propylene or butylene;

(4) The reaction is carried out with irradiation of ultraviolet light, but without any catalyst, or other modifying or controlling agent;

(5) The reaction to be carried out at temperatures from 0° C. to 100° C.;

(6) The products of the reaction are mainly, if not exclusively, alkenyl hydroperoxides, that is hydroperoxides having a double bond in the alkyl radical.

As regards by-products, there may be produced a small amount of polymer, and a small amount of decomposition products of hydroperoxides, which are unsaturated ketones, aldehydes, and acids.

We claim:

1. In the manufacture of alkenyl hydroperoxides, the process which consists substantially in reacting an aliphatic mono-olefine containing at least three carbon atoms in the liquid state with oxygen at a temperature within the range of 0° to 100° C. while irradiating the reaction mixture with ultraviolet light, and recovering the alkenyl hydroperoxides thus produced.

2. In the manufacture of alkenyl hydroperoxides, the process which comprises reacting an aliphatic mono-olefine containing at least three carbon atoms and in the liquid state with oxygen at a temperature within the range of 0° C. to 100° C. while irradiating the reaction mixture with ultraviolet light and in the absence of extraneous catalysts, and recovering the alkenyl hydroperoxides thus produced.

3. In the manufacture of alkenyl hydroperoxides, the process which comprises reacting trimethyl ethylene in the liquid state with oxygen at a temperature within the range of from 0° to 100° C. while irradiating the reaction mixture with ultraviolet light and in the absence of extraneous catalysts, and recovering the resulting alkenyl hydroperoxides.

VINCENT RICHARD GRAY.
HERBERT STEINER.

REFERENCES CITED

The following references are of record in the file of this patent:

UNITED STATES PATENTS

| Number | Name | Date |
|---|---|---|
| 2,131,806 | Ipatieff et al. | Oct. 4, 1938 |
| 2,369,182 | Rust et al. | Feb. 13, 1945 |
| 2,423,949 | Rust et al. | July 15, 1947 |
| 2,430,864 | Farkas et al. | Nov. 18, 1947 |
| 2,430,865 | Farkas et al. | Nov. 18, 1947 |
| 2,435,763 | Vaughan et al. | Feb. 10, 1948 |

OTHER REFERENCES

Ellis et al.: Chemical Action of Ultraviolet Rays, 1941, page 407.